United States Patent [19]

Forman et al.

[11] Patent Number: 5,544,353
[45] Date of Patent: Aug. 6, 1996

[54] DISTRIBUTED PROCESSING OBJECT SHARED RESOURCE CONTROL APPARATUS AND METHOD

[75] Inventors: Ira R. Forman; Hari H. Madduri, both of Austin, Tex.

[73] Assignee: International Business Machines Corporation, Armonk, N.Y.

[21] Appl. No.: 77,211

[22] Filed: Jun. 14, 1993

[51] Int. Cl.⁶ .................................................. G06F 17/30
[52] U.S. Cl. ...................... 395/600; 395/726; 364/974; 364/963; 364/282.1; 364/282.2; 364/DIG. 1; 364/281.8; 364/228.1; 364/262.3; 364/281.6
[58] Field of Search ..................... 395/600, 650, 395/726, 727, 728, 729; 1/725

[56] References Cited

U.S. PATENT DOCUMENTS

| | | | |
|---|---|---|---|
| 4,961,224 | 10/1990 | Yung | 380/25 |
| 5,206,952 | 4/1993 | Sundet et al. | 395/725 |
| 5,305,448 | 4/1994 | Insalaco et al. | 395/425 |
| 5,333,316 | 7/1994 | Champagne et al. | 395/600 |
| 5,388,255 | 2/1995 | Pytlik et al. | 395/600 |

FOREIGN PATENT DOCUMENTS

0465871A2  2/1992  European Pat. Off. .

OTHER PUBLICATIONS

IBM Technical Disclosure Bulletin vol. 34 No. 9, Feb. 1992, Technique For Fast Query Of A LAN-Based Database.

Primary Examiner—Thomas G. Black
Assistant Examiner—Peter Y. Wang
Attorney, Agent, or Firm—Mark S. Walker; David A. Mims, Jr.

[57] ABSTRACT

A system and method for determining a master process for control of a shared system resource. The improved system requires the master process to hold exclusive access on a shared resource control file only intermittently. The master process periodically updates the shared resource control file with a new timestamp. Processes seeking resource access read the shared control file and determine whether another process has been designated master. If the interval since the latest timestamp is greater than a preset staleness interval, the shared control file is discarded and a new one created by the accessing process.

6 Claims, 3 Drawing Sheets

DISTRIBUTED PROCESSING OBJECT SHARED RESOURCE CONTROL APPARATUS AND METHOD

BACKGROUND OF THE INVENTION

1. Field of the Invention

The present invention relates to the operation of distributed processing computer systems. In particular it relates to those systems that have a plurality of processing nodes each one having access to a number of shared resources and which require apparatus and methods for managing access to the shared resources. Still more particularly, the present invention relates to the management of a shared control file that designates one of a number of distributed processes as the master process for controlling access to that shared resource.

2. Background and Related Art

Distributed computer systems are created by linking a number of computer systems using a communications network. Distributed systems frequently have the ability to share data resident on a individual systems. Replicated data systems implement data sharing by providing a replica copy of a data object to each process using that data object. Replication reduces the access time for each processor by eliminating the need to send messages over the network to retrieve and supply the necessary data. A replicated object is a logical unit of data existing in one of the computer systems but physically replicated to multiple distributed computer systems. Replicated copies are typically maintained in the memories of the distributed systems.

Replicated data objects also speed the update process by allowing immediate local update of a data object. Replication introduces a control problem, however, because many copies of the data object exist. The distributed system must have some means for controlling data update to ensure that all copies of the data remain consistent.

Prior art systems control data consistency by establishing a master data object copy in one of the distributed systems. The master copy is always assumed to be valid. Data object update by a system other than that of the master copy requires sending the update request to the master for update and propagation to all replicas. This approach has the disadvantage of slowing local response time as the master data object update and propagation are performed.

Another means for controlling replicated data is described in Moving Write Lock for Replicated Objects, commonly assigned, filed on Oct. 16, 1992 as Ser. No. 07/961,757, now U.S. Pat. No. 5,418,966. The apparatus and method of that invention require that a single "write lock" exist in a distributed system and be passed to each process on request. Data object updates can only be performed by the holder of the "write lock." The "write lock" holder may update the local object copy and then send that update to the master processor for its update and propagation to other processes. The above patent application is incorporated by reference.

The method for determining which of a number of distributed processes is to be master is described in commonly assigned patent application Ser. No. 07/961,750 filed Oct. 16, 1992 and entitled Determining a Winner of a Race in a Data Processing System, now U.S. Pat. No. 5,469,575. The "race" between each process potentially controlling a resource results in the assignment of master status to the process first establishing write control over a Share Control File. Once control has been established by one process, other processes are assigned "shadow" status. Master process failure causes reevaluation of master status. This patent application is also incorporated by reference.

The technical problem addressed by the present invention is providing fault-tolerant features to a distributed processing system using write lock management of replicated data objects. Fault tolerance is required to ensure that no data or updates are lost due to the failure of a master process. Prior art systems, including those referenced above, require the master determination and write lock control to be reinitialized. This could result in loss of data if a locally updated data object replica has not been propagated to the master or other replicas.

SUMMARY OF THE INVENTION

The present invention is directed to an improved system and method for managing a distributed processing system. The system for designating a master process for a data object is improved to reduce the length of time exclusive control of a master process indicator is required while maintaining the ability of the indicator to show master status. The master process that wins the race for control holds temporary write access to a control indicator to update its master data and then relinquishes control. Periodically thereafter, the master process updates the control indicator. Any other process accessing the control indicator will know that another process is master unless the last master update is stale. In that case, the surviving processes again race for control.

The present invention includes a process of determining a master process for control of a shared resource in a computer system having a number of processes operating on at least one processor that has a memory and access to a shared data storage means. The process includes testing the shared data storage means for the presence of a shared resource control file for the shared resource; if no file exists, creating a shared resource control file in the shared data storage means, writing master process identification information to the shared resource control file, and writing a timestamp to the control file; if a file exists, requesting exclusive access to the file; if access denied, waiting and retrying; if access granted, determining the difference between current time and the last time stamp; if the difference is less than a first preset interval, designating the requesting process as a shadow process; if the difference is greater than the first preset interval, discarding the shared resource control file, creating a new shared resource control file and writing master process identification information to the shared resource control file, and writing a timestamp to the control file; if the requesting process is a master process for the shared resource, replacing the timestamp in the shared resource control file with a current timestamp after a preset second interval has passed.

It is an object of the present invention to improve master process efficiency by reducing the length of time exclusive control over a master process indicator is required.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

The present invention is practiced in a distributed processing computer environment. This environment consists of a number of computer processors linked together by a communications network. Alternatively, the present invention could be practiced in a multiprogramming system in which a single computer (e.g. single CPU) supports the execution of multiple processes each having a separate address space.

Figure 1:
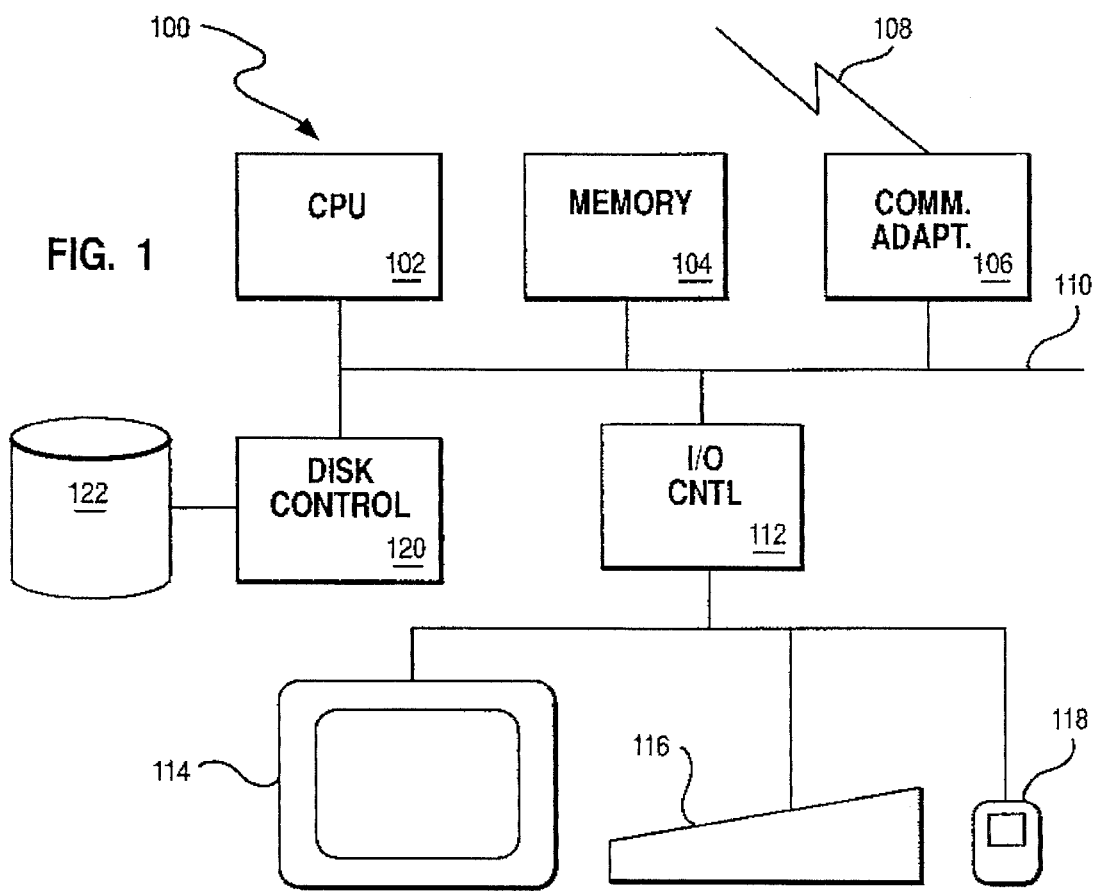
FIG. 1 is a block diagram of a computer system of the type in which the present invention is embodied.

The preferred embodiment is practiced with linked computers. Each computer typically has the components shown generally for the system 100 in FIG. 1. Processing is provided by central processing unit or CPU 102. CPU 102 acts on instruction and data stored in random access memory 104. Long term storage is provided on one or more disks 122 operated by disk controller 120. A variety of other storage media could be employed including tape, CD-ROM, or WORM drives. Removable storage media may also be provided to store data or computer process instructions. Operators communicate with the system through I/O devices controlled by I/O controller 112. Display 114 presents data to the operator while keyboard 114 and pointing device 118 allow the operator to direct the computer system. Communications adapter 106 controls communications between this processing unit and others on a network to which it connected by network interface 108.

Computer system 100 can be any known computer system including microcomputers, mini-computers and mainframe computers. The preferred embodiment envisions the use of computer systems such as the IBM Personal System/2 (PS/2) or IBM RISC System/6000 families of computers. (IBM, Personal System/2, PS/2 and RISC System/6000 are trademarks of the IBM Corp.) However, workstations from other vendors such as Sun Microsystems, Inc. or Hewlett Packard may be used, as well as computers from Compaq Computer Corp. or Apple Computer Corp.

Figure 2:
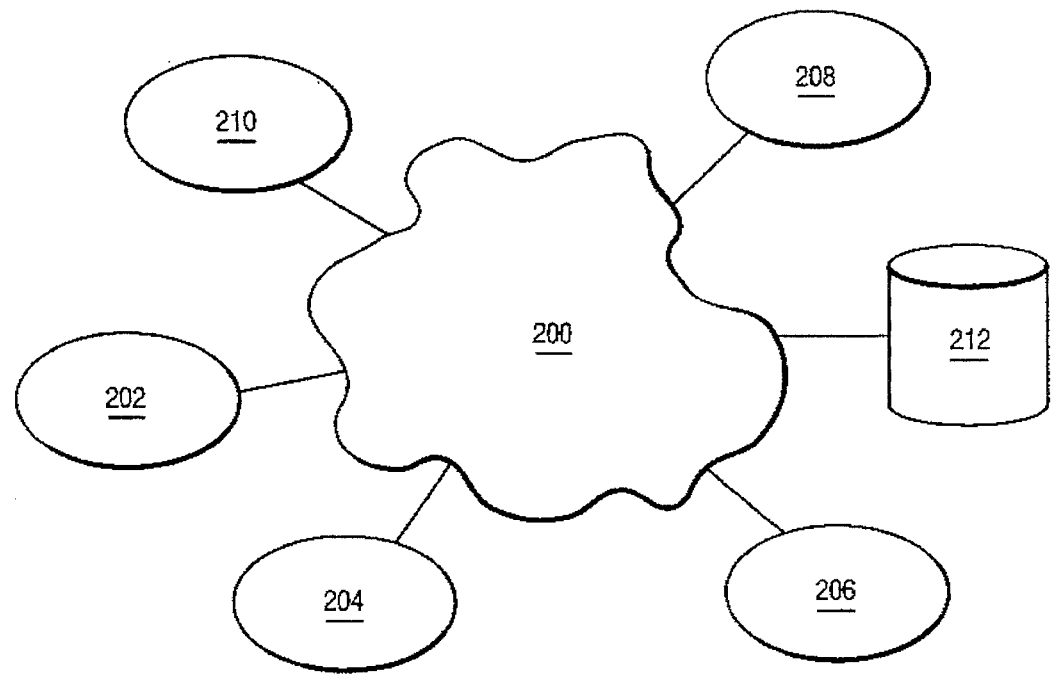
FIG. 2 is a block diagram of a distributed network according to the present invention.

A distributed processing system is shown in FIG. 2. Each of the processing nodes 202, 204, 206, 208, 210 is connected to a network 200 that enables communications among the processors. Additional permanent storage may be associated with the network as shown by disk storage unit 212. In the alternative, persistent storage in one of the processing nodes could be used for network persistent storage.

Network 200 can be any type of network including LAN, WAN, ATM or other. Physical network protocols such as Ethernet or Token Ring can be used and communications protocols such as TCP/IP or Netbios or Novell Netware can control the network. Network file system management can be provided by a program based on the Sun Microsystems NFS technology or CMU AFS technology. Each of these file system programs allows distributed processes to access and manage data residing on remote systems. These systems create a single logical file system for each processor regardless of the physical location of individual files. NFS is described in greater detail in the IBM Corp. publication *Communication Concepts and Procedures*, Order No. SC23-2203-00.

The variety of permitted networks means that the processing nodes may be distributed throughout a building, across a campus, or even across national boundaries.

The preferred embodiment of the present invention is practiced in a distributed network of peer processing nodes. Peer nodes each have equal status in the network with none being master or slave nodes. Using peer nodes improves network efficiency because there is no single bottleneck through which requests must be funnelled. Instead each node can act independently to perform its functions. Another advantage is that failure of any particular node will not cause the entire network to fail as would be the case where a master processor existed. The disadvantage of peer networks is that there is no focal point for controlling data integrity of replicated data.

Figure 3:
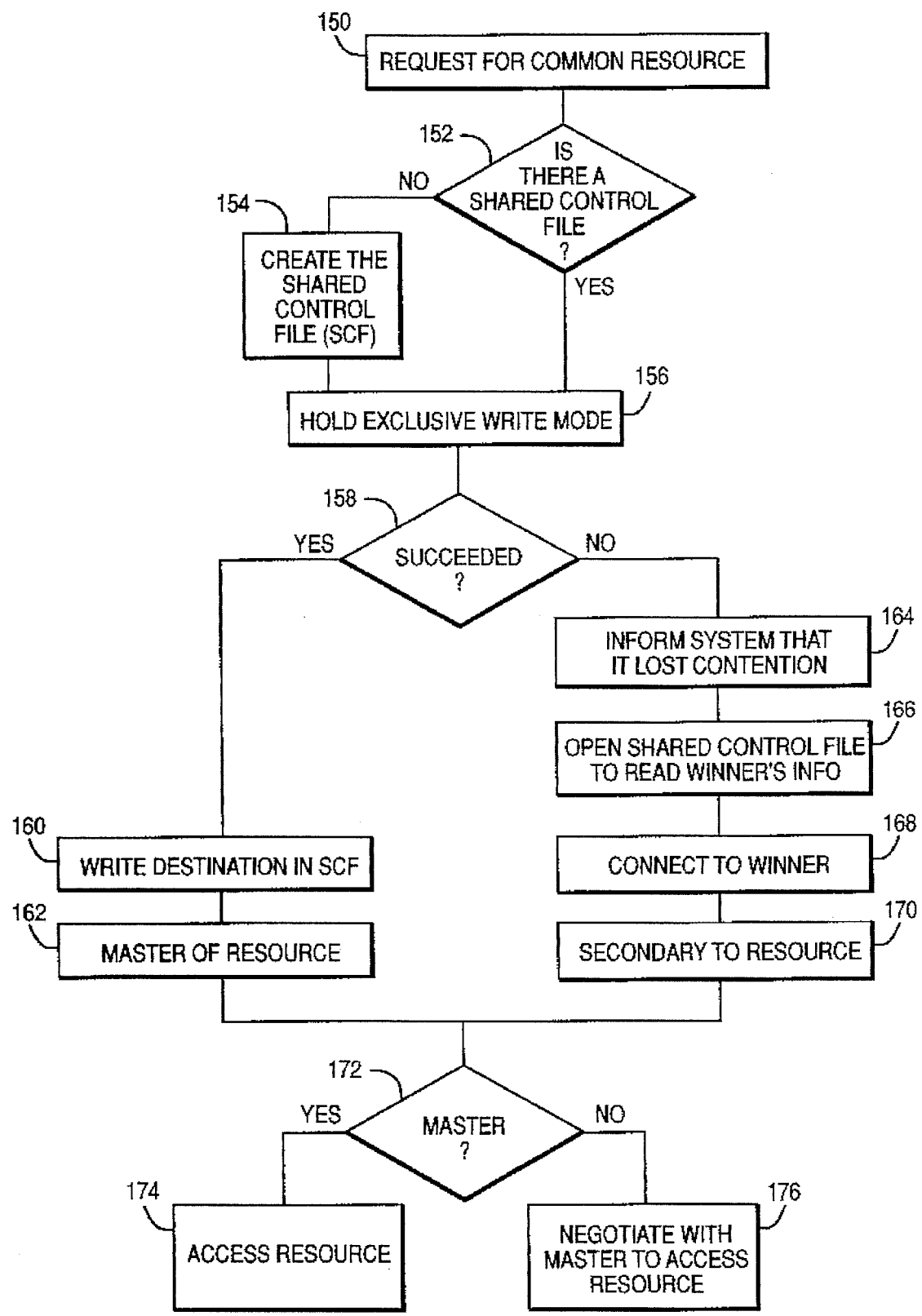
FIG. 3 is a flowchart depicting the master resolution logic of prior art systems.

The above referenced patent application for Determining the Winner of a Race in a Data Processing System teaches a procedure for "racing" for control of a resource. FIG. 3 illustrates the steps of this process. The process starts by generating a request for a common resource 150. The process requesting the resource tests to determine whether or not a shared control file exists 152. If not, the process creates a shared control file 154. In either case, the process attempts to hold exclusive write access 156. If this is successful 158 the process updates the shared control file 160 and it becomes master of that resource 162. If the attempt to acquire exclusive write failed, the process is not the master 164 and must read the name of the master from the shared control file 166 and connect to the master 168 as a shadow 170. If the requesting process is the master, it can directly access the resource, otherwise, it is a shadow process and must negotiate with the master for access 176.

The shared control file of the preferred embodiment is a storage file in the logical file system. As such, it resides on one of the permanent storage devices in the distributed system. The present invention is equally applicable, however, to a shared resource control file managed in volatile memory (RAM) that is sharable among the distributed processes.

The requirement that the master process maintain an exclusive write lock 156 on the shared control file is undesirable in many systems. Each process may be master of a number of resources. Each replicated data object has a master and a particular user may cause a single process to be master of a large number of data objects. Each exclusive write lock ties up a process file descriptor. In many operating systems, the number of file descriptors allocated to each process is limited. For example, older versions of the UNIX operating system (UNIX is a registered trademark of Unix System Laboratories, Inc) allowed only four or five open file descriptors per process. Thus, a particular process may be restricted in accessing resources because of a limit on file descriptors.

The present invention is directed to removing that limitation by allowing the master to release the exclusive write mode while still being the master process for that resource. The previous system indicated race failures to shadows by denying them the exclusive write access to the shared control file. The present invention replaces this master status indicator with a timestamp and control file age check. This change allows an unlimited number of replicated objects for each process.

Figure 4:
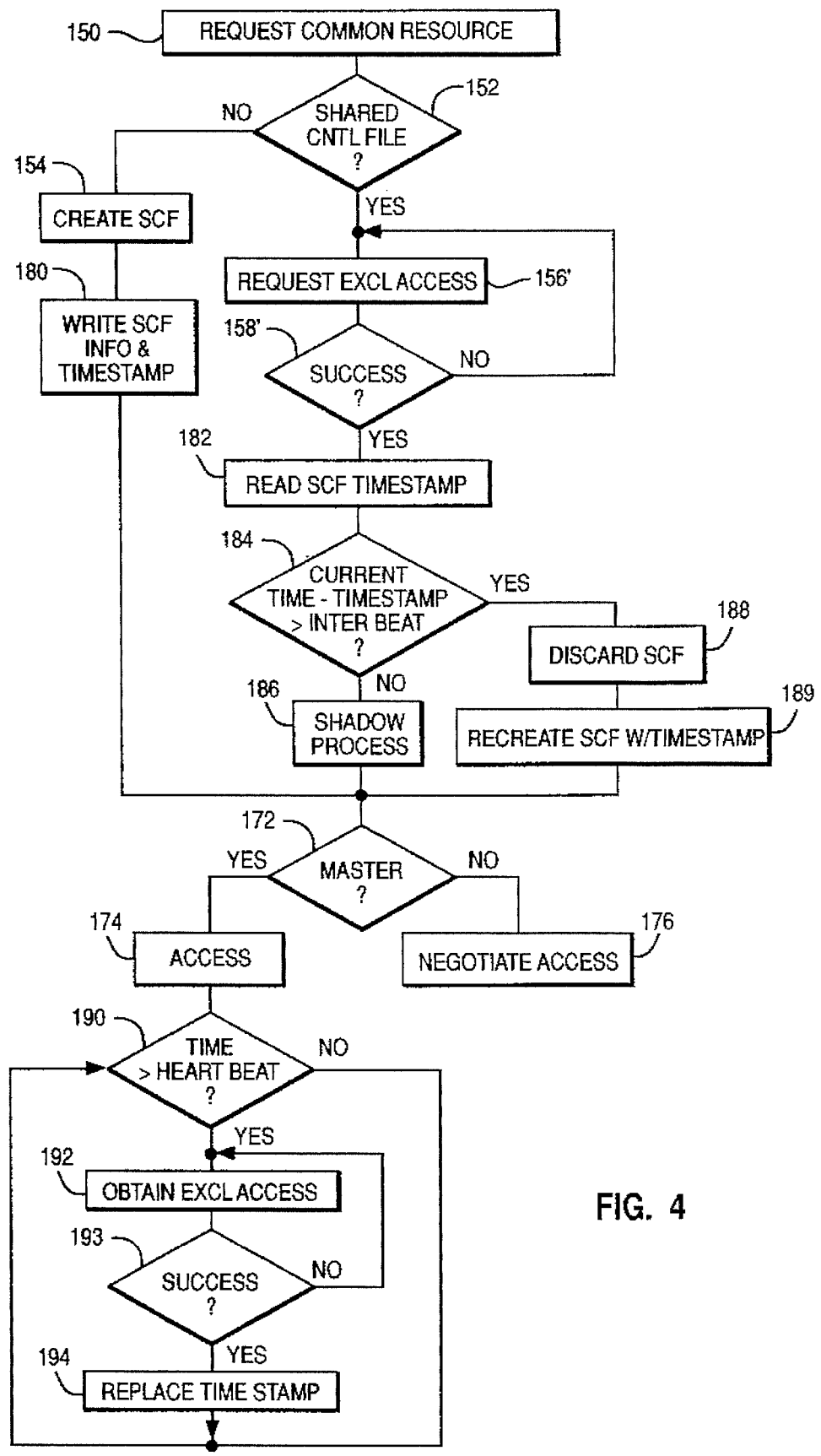
FIG. 4 is a flowchart depicting the master resolution logic of the preferred embodiment of the present invention.

The selection of the master process (the winner of the race) in the preferred embodiment of the present invention will be described with reference to FIG. 4 in which reference numbers corresponding to the reference numbers of FIG. 3 indicate equivalent process steps.

The process starts when a processor requests a common resource 150. The existence of a shared control file is tested 152. If no shared control file exists, the process creates one 154, obtains exclusive access, and writes identifying data including the master identity and a timestamp 180. Processing continues at test 172 where status is checked prior to access.

When a shared control file exists, the process attempts to gain exclusive write access to the file 156'. Failure to gain access means another process has exclusive access to the shared control file. In the preferred embodiment, either the master or shadow could have exclusive access to the process must retry 156' until it actually acquires exclusive access to check its status.

Success in this case does not assure the process that it is master. Instead, the process must read the timestamp value from the shared control file 182 and compare it to the current time 184. If the difference between the current time and the time stamp is less than a set period INTER_BEAT the designated master process is still in control and the requesting process is a shadow process 186. If the difference is greater than INTER_BEAT then the shared control file is stale. The requesting process discards the old shared control file 188 and creates a new one in which it writes its own master process identification and timestamp 189. Processing continues at step 172.

The process requesting resource access tests whether it is the master of that resource at 172. If it is the master, it may access the resource 174. If not, it is a shadow process and must negotiate for access 176. The master process must continually update the shared control file to maintain control as the master. Every HEART_BEAT seconds 190 the master process attempts to obtain exclusive access to the shared control file. The request may fail 193 due to a shadow process holding exclusive access to check master status. If the request fails, the master process waits and tries again. If the request succeeds, the master replaces the timestamp.

The periods INTER_BEAT and HEART_BEAT are set by the application developer. INTER_BEAT-HEART_BEAT must be greater than the expected wait time for the master process to gain exclusive write access in step 192. If it is too short, the shared control file will be prematurely invalidated. On the other hand, if INTER_BEAT is too long transfer of control to one of the shadow processes will be delayed. The preferred embodiment sets HEART_BEAT at 30 seconds and INTER_BEAT at 90 seconds. These values ensure that the process does not tie up system resources in frequent timestamp updates, but provides sufficiently prompt discovery of master process failure.

The system of the present invention has the advantage of reducing the length of time a process must hold an exclusive lock. It also assures that failure of a master process can be detected and another master established without undue delay.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A method of determining a master process for control of a shared resource in a computer system having a plurality of processes operating on at least one processor that has a memory and access to a shared data storage means, the method comprising:

testing said shared data storage means for the presence of a shared resource control file for said shared resource;

if no file exists, creating a shared resource control file in said shared data storage means, writing master process identification information to said shared resource control file, and writing a timestamp to said control file;

if a file exists, requesting exclusive access to said file;

if access denied, waiting and retrying until exclusive access to said file is obtained;

if access granted, determining the difference between current time and the last time stamp;

if said difference is less then a first preset interval, designating the requesting process as a shadow process;

if said difference is greater than said first preset interval, discarding said shared resource control file, creating a new shared resource control file and writing master process identification information to said shared resource control file, and writing a timestamp to said control file;

if said requesting process is a master process for said shared resource, replacing the timestamp in said shared resource control file with a current timestamp after a preset second interval has passed.

2. The method of claim 1 wherein said shared data storage means is a network file system.

3. The method of claim 1 wherein said shared data storage means is shared volatile memory.

4. A system for controlling sharing of a plurality of shared resources in a distributed processing system having a plurality of processors connected by a communications means, the system comprising:

means for testing said plurality of shared resources for the presence of a shared resource control file for said shared resource;

shared resource control means for creating and storing data in said shared resource control file indicating a process as controlling process for each of said plurality of shared resources and data indicating a time of a last update of said shared resource control means by said controlling process;

access control means for limiting exclusive access to said shared resource control means to at most one process;

shared resource control read means for reading data from said shared resource control means;

comparison means for comparing said data indicating the time of the last update and the current time to determine an elapsed interval;

release means for releasing said shared resource control file if said elapsed internal is greater than a first value;

update means for periodically causing said controlling process to replace said data indicating the time of the last update with the current time.

5. A computer program product having a computer readable medium having computer program logic recorded thereon for determining control of a shared resource, said computer program product comprising:

means for testing said shared data storage means for the presence of a shared resource control file for said shared resource;

means for creating a shared resource control file in said shared data storage means, if no file exists, and for writing master process identification information to said shared resource control file, and writing a timestamp to said shared resource control file;

means for requesting exclusive access to said file, if a file exists;

means for waiting and retrying until exclusive access to said file is obtained, if access denied;

means for determining the difference between current time and the last time stamp, if access granted;

means for designating the requesting process as a shadow process, if said difference is less than a first preset interval;

means for discarding said shared resource control file, if said difference is greater then said first preset interval, means for creating a new shared resource control file and writing master process identification information to said shared resource control file, and writing a timestamp to said control file;

means for replacing the timestamp in said shared resource control file with a current timestamp after a preset second interval has passed, if said requesting process is a master process for said shared resource.

6. A system for determining a master process for control of a shared resource in a computer system having a plurality of processes operating on at least one processor that has a memory and access to a shared data storage means, the system comprising:

means for testing said shared data storage means for the presence of a shared resource control file for said shared resource;

means for creating a shared resource control file in said shared data storage means if no file exists, and means for writing master process identification information to said shared resource control file, and writing a timestamp to said control file;

means for requesting exclusive access to said file if a file exists;

means for waiting and retrying until exclusive access to said file is obtained if access denied;

means for determining the difference between current time and the last time stamp if access granted;

means for designating the requesting process as a shadow process if said difference is less then a first preset interval;

means for discarding said shared resource control file, creating a new shared resource control file and writing master process identification information to said shared resource control file, and writing a timestamp to said control file if said difference is greater than said first preset interval; and means for replacing the timestamp in said shared resource control file with a current timestamp after a preset second interval has passed if said requesting process is a master process for said shared resource.

* * * * *